Nov. 17, 1925.
S. G. DOWN
1,561,704
BRAKE SHOE CONSTRUCTION
Filed Nov. 1, 1923
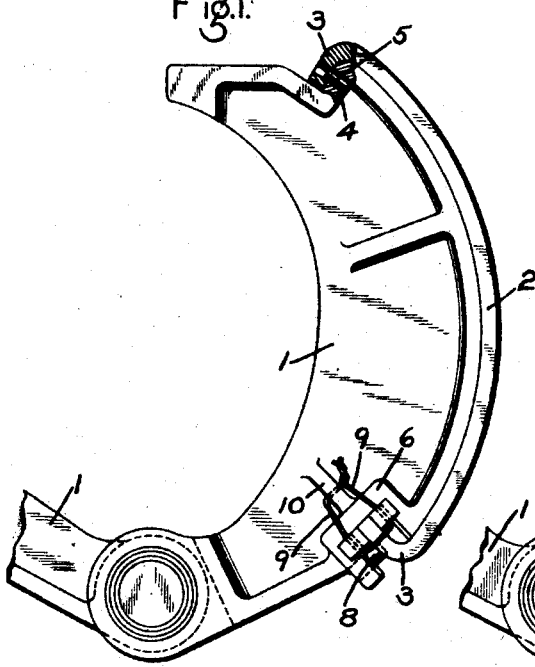
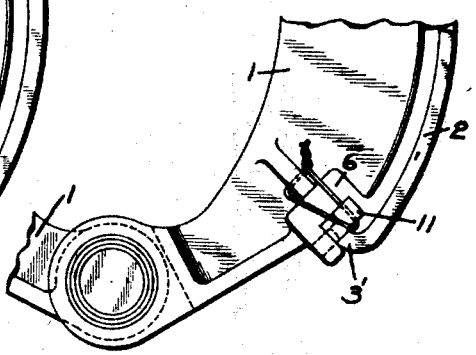
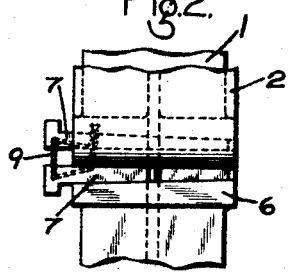
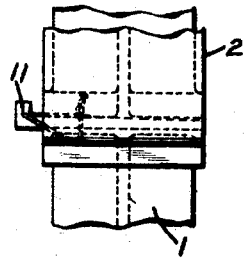
INVENTOR
SIDNEY G. DOWN
BY
ATTORNEY Patented Nov. 17, 1925.

1,561,704

UNITED STATES PATENT OFFICE.

SIDNEY G. DOWN, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

BRAKE-SHOE CONSTRUCTION.

Application filed November 1, 1923. Serial No. 672,122.

*To all whom it may concern:*

Be it known that I, SIDNEY G. DOWN, a citizen of the United States, residing at Pittsburgh, in the county of Allegheny and State of Pennsylvania, have invented new and useful Improvements in Brake-Shoe Constructions, of which the following is a specification.

This invention relates to brake shoes, and more particularly to a brake shoe construction adapted for an internal expanding drum type of brake, such as employed on motor vehicles.

The principal object of my invention is to provide an improved brake shoe construction of the above character.

In the accompanying drawing; Fig. 1 is a side elevation of a brake head, showing my improved brake shoe construction applied thereto; Fig. 2 a detail plan view of the brake shoe fastening means; Fig. 3 a partial side elevation of a brake head and brake shoe, showing a modified shoe fastening means; and Fig. 4 a detail plan view of the fastening means shown in Fig. 3.

As shown in Figs. 1 and 2, the brake head 1 is provided with an arcuate face for receiving a brake shoe 2 and according to my invention, the brake shoe may comprise a plate formed to engage the arcuate face of the brake head and having its opposite ends turned inwardly to form lips 3. At one end of the arcuate face, the brake head is provided with a shoulder 4 for receiving the corresponding lip 3 of the brake shoe and secured in the shoulder 4 is a dowel pin 5 adapted to engage in a recess provided in the lip 3. At the other end of the arcuate face, the brake head 1 is provided with a thickened section 6 having a transverse T slot. The extended portion of the T slot has tapered side walls against which wedges 7 engage.

When the brake shoe is applied to the brake head, the shoe may be first moved axially with respect to the head and when the dowel pin opening therein has been brought into registry with the dowel pin 5, the shoe is shifted radially, so that the dowel pin engages in the dowel pin opening. A similar dowel pin 8 also engages a similar recess in the lip 3 at the opposite end of the shoe. The wedges 7 are then inserted in the extended portion of the T slot in the section 6, at opposite sides of the lip 3 and said wedges are driven tight, so as to firmly hold the brake shoe in position. In order to prevent the wedges from working loose, a wire 9 may be passed through holes in the heads of the wedges and through a hole in the rib 10 of the brake head. The ends of the wire are then twisted together as shown.

As shown in Figs. 3 and 4, a single wedge 11, may be employed instead of the two wedges employed in the previously described construction. In this case the slot in the section 6' is made L shaped and the single wedge 11 is driven in at one side of the lip 31, as shown. Otherwise the shoe construction is similar to that shown in Figs. 1 and 2.

Since with the above described construction, the shoe may be applied and removed by an axial movement of the shoe, it is not necessary to remove the vehicle wheel in case it is desired to replace a worn shoe.

Having now described my invention, what I claim as new and desire to secure by Letters Patent, is:—

1. The combination with a brake head having an arcuate face, of a brake shoe formed to engage said arcuate face and having an inwardly turned end portion extending into a slot in the brake head and a wedge mounted in said slot at each side of said inwardly turned end position for securing the brake shoe to the brake head.

2. The combination with a brake head having an arcuate face and a section at one end of said face having a transverse T slot, of a brake shoe formed to engage said arcuate face and having an end portion bent to extend into said slot and wedges in said slot at opposite sides of said end portion for securing said brake shoe to the brake head.

3. The combination with a brake head having an arcuate face and provided with longitudinally disposed dowel pins adjacent to opposite ends of the arcuate face, of a brake shoe formed to engage said arcuate face and having its opposite ends inwardly bent and provided with recesses adapted to receive said dowel pins.

4. The combination with a brake head having an arcuate face and provided at one end of the arcuate face with a section having a transverse slot, of a brake shoe formed to engage said arcuate face and having an inwardly bent end portion engaging in said slot, a wedge in said slot engaging said end portion of the brake shoe, and a dowel pin carried by said brake head and extending into said slot for engaging a recess in the end portion of the brake shoe.

In testimony whereof I have hereunto set my hand.

SIDNEY G. DOWN.